(12) United States Patent
Zhou

(10) Patent No.: US 9,281,516 B2
(45) Date of Patent: Mar. 8, 2016

(54) CATHODE MATERIAL OF LITHIUM ION SECONDARY BATTERY AND METHOD FOR MANUFACTURING THE SAME

(75) Inventor: Xiao-Ping Zhou, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 459 days.

(21) Appl. No.: 13/541,756

(22) Filed: Jul. 4, 2012

(65) Prior Publication Data

US 2013/0011738 A1    Jan. 10, 2013

(30) Foreign Application Priority Data

Jul. 4, 2011  (CN) .......................... 2011 1 0188328

(51) Int. Cl.
| | | |
|---|---|---|
| H01M 4/131 | (2010.01) |
| H01M 4/136 | (2010.01) |
| H01M 4/505 | (2010.01) |
| H01M 4/525 | (2010.01) |
| H01M 4/36 | (2006.01) |
| H01M 4/62 | (2006.01) |
| H01M 10/0525 | (2010.01) |

(52) U.S. Cl.
CPC .............. *H01M 4/136* (2013.01); *H01M 4/131* (2013.01); *H01M 4/366* (2013.01); *H01M 4/505* (2013.01); *H01M 4/525* (2013.01); *H01M 4/62* (2013.01); *H01M 10/0525* (2013.01); *Y02E 60/122* (2013.01); *Y02P 70/54* (2015.11)

(58) Field of Classification Search
CPC ............................ H01M 4/131; H01M 4/1395
USPC ...................... 429/221, 223, 231.3, 209, 224; 427/126.6, 126.1; 252/500
See application file for complete search history.

(56) References Cited

U.S. PATENT DOCUMENTS

| | | | | |
|---|---|---|---|---|
| 5,705,291 | A * | 1/1998 | Amatucci et al. | 429/137 |
| 6,383,235 | B1 * | 5/2002 | Maegawa et al. | 29/623.5 |
| 7,138,209 | B2 * | 11/2006 | Kweon et al. | 429/231.1 |
| 2006/0121760 | A1 * | 6/2006 | Kaneko | H01R 13/506 439/212 |
| 2010/0308278 | A1 * | 12/2010 | Kepler | H01M 4/139 252/506 |

FOREIGN PATENT DOCUMENTS

| | | | |
|---|---|---|---|
| CN | 1627550 A | | 6/2005 |
| CN | 1797882 A | | 7/2006 |
| CN | 101038965 A | * | 9/2007 |
| CN | 101359736 A | | 2/2009 |
| CN | 101908625 A | | 12/2010 |
| DE | 10342974 A1 | * | 4/2005 |
| JP | 2011-76822 A | | 4/2011 |
| JP | 2011076822 A | * | 4/2011 |

* cited by examiner

*Primary Examiner* — Mark Kopec
*Assistant Examiner* — Danny N Kang
(74) *Attorney, Agent, or Firm* — Cheng-Ju Chiang

(57) ABSTRACT

A cathode material of a lithium ion secondary battery is provided, which includes a cathode active material and a glassy material coating on a surface of the cathode active material. The glassy material is capable of selectively allowing lithium ions to pass therethrough. The lithium ion secondary battery using the cathode material has the long cycle life and the high safety performance.

17 Claims, 5 Drawing Sheets ary battery and a method for manufacturing the cathode material of the lithium ion secondary battery.

BACKGROUND OF THE INVENTION

With development of electronic technology, miniaturization and multi-functionalization have become a trend of developing electronic devices. High energy secondary batteries, such as lithium-ion secondary batteries, are now widely used for providing electrical power to the electronic devices. Currently, the commercialized lithium-ion secondary batteries have high energy density and long cycle life, which can satisfy the most of the electronic devices. However, it is still desired to further improve the energy density, the cycle life and the safety of the lithium-ion secondary batteries so that the lithium-ion secondary batteries can satisfy more electronic devices such as electric vehicles.

A conventional lithium ion secondary battery consists of four main parts including a positive electrode, a negative electrode, a separator and an electrolyte. Generally, the cycle life and the safety of the lithium ion secondary battery are determined by the properties of the four main parts. In particular, a cathode material of the positive electrode will affect the performance of the lithium ion secondary battery as follows.

(1) During a charge-discharge cycle, electrons are migrated from lattices of the cathode material or into the lattices of the cathode material, thereby causing a volume contraction or a volume expansion of the cathode material. After a number of charge-discharge cycles, the lattices of the cathode material are partially damaged. Thus, the capacity of the lithium ion secondary battery is decreased.

(2) When the lithium ion secondary battery is in a charged state, transition metal ions in the cathode material are transformed into high valence metal ions with strong oxidability. However, the electrolyte is generally comprised of reductive organic compounds. The reductive organic compounds are oxidized by an oxidation-reduction reaction on the surface of the cathode material to generate water ($H_2O$), carbon monoxide (CO), carbon dioxide ($CO_2$) and other reaction products, which will cause the decrease of the capacity of the lithium ion secondary battery. Moreover, under a high temperature condition, the oxidation-reduction reaction of the reductive organic compounds can cause the combustion and the explosion of the lithium ion secondary battery.

(3) If the electrolyte includes a trace mount of active alcohols, the active alcohols can react with the cathode material in the charged state to generate $H_2O$, CO, $CO_2$. Thus, the capacity of the lithium ion secondary battery is also decreased.

To improve the properties of the cathode material, a coated cathode material is researched. In Chinese Patent No. CN 200310112600.9, Liu et al. disclose a cathode material coated with an oxide for a lithium ion battery. The oxide can be a metal oxide or non-metal oxide. The metal oxide can be an oxide of at least one of aluminum (Al), magnesium (Mg), zinc (Zn), calcium (Ca), strontium (Sr), lanthanum (La), cerium (Ce), vanadium (V), titanium (Ti), tin (Sn), and the non-metal oxide can be an oxide of at least one of silicon (Si) and boron (B). However, the metal oxide or the non-metal oxide has a high melting point, and is prone to forming its own crystalline phase. In other words, the metal oxide or the non-metal oxide can not form a compact film. Thus, the cathode material can not be effectively coated by the metal oxide or the non-metal oxide. Further, lithium ions can not selectively pass through the metal oxide or the non-metal oxide coating layer. Thus, in fact, the cathode material coated with the metal oxide or the non-metal oxide can not improve the charge-discharge performance and the cycle life of the lithium ion battery.

In Chinese Patent No. CN 200810063159.2, Wang et al. disclose a method for coating a cathode material with $Li_2O.2B_2O_3$. The $Li_2O.2B_2O_3$ is substantially similar to $Li_2B_4O_7$ and $Na_2B_4O_7$. It is well known that the $Na_2B_4O_7$ is prone to absorbing water to generate $Na_2B_4O_7.10H_2O$. Similarly, the $Li_2O.2B_2O_3$ is also prone to absorbing water. Therefore, it is very difficult to achieve dehydration during forming the positive electrode by using the cathode material with the $Li_2O.2B_2O_3$. Moreover, the $Li_2O.2B_2O_3$ can not form a compact film. Thus, the cathode material can not be effectively coated by the $Li_2O.2B_2O_3$. Thus, in fact, the cathode material coated with the $Li_2O.2B_2O_3$ can also not effectively improve the charge-discharge performance and the cycle life of the lithium ion battery.

SUMMARY OF THE INVENTION

The present invention is directed to a cathode material of a lithium ion secondary battery so that the lithium ion secondary battery using the cathode material has the long cycle life and the high safety performance.

The present invention is further directed to a method of manufacturing a cathode material of a lithium ion secondary battery, which is very simple, has low production cost and is easy to industrialization.

The present invention provides a cathode material of a lithium ion secondary battery, which includes a cathode active material and a glassy material coating on the surface of the cathode active material. The glassy material is capable of selectively allowing lithium ions to pass therethrough.

In one embodiment, the cathode active material is at least one selected from a group consisting of lithium cobalt oxide, lithium nickel oxide, lithium manganese oxide, lithium nickel cobalt oxide, lithium nickel manganese oxide, lithium nickel cobalt manganese oxide and lithium iron(ii) phosphate.

In one embodiment, the glassy material is a lithium boron silicon oxide. The lithium boron silicon oxide has the following chemical formula: $Li_xB_ySi_zO_{(0.5x+1.5y+2z)}$ (x>0, y>0, z>0). A molar ratio of boron atoms to silicon atoms in the lithium boron silicon oxide (y:z) is in a range from 1:1 to 10:1, and a molar ratio of lithium atoms to the boron atoms and the silicon atoms in the lithium boron silicon oxide (x:(y+z)) is in a range from 2:1 to 1:10. In one example, a molar ratio of lithium atoms, boron atoms and silicon atoms in the lithium boron silicon oxide (x:y:z) is either 2:2:1 or 2:1:1.

In one embodiment, a weight percentage of the lithium boron silicon oxide to the cathode material is in a range from 0.5% to 20.0%. Preferably, the weight percentage of the lithium boron silicon oxide to the cathode material is in a range from 1% to 15.0%. Further preferably, the weight percentage of the lithium boron silicon oxide to the cathode material is in a range from 1.5% to 10.0%.

The present invention further provides a method of manufacturing a cathode material of a lithium ion secondary battery. At first, a step of preparing a mixture solution by mixing a silicon-containing material, a boron-containing material and a lithium-containing material into a solvent is performed. Then, a cathode active material is added into the mixture solution to form a mixture slurry. Next, the mixture slurry is dried to form a dried mixture. Thereafter, the dried mixture is sintered to obtain the cathode active material coated with a glassy material, wherein the glassy material is capable of selectively allowing lithium ions to pass therethrough.

In one embodiment of the method of manufacturing the cathode material, the cathode active material is at least one selected from a group consisting of lithium cobalt oxide, lithium nickel oxide, lithium manganese oxide, lithium nickel cobalt oxide, lithium nickel manganese oxide, lithium nickel cobalt manganese oxide and lithium iron(ii) phosphate.

In one embodiment of the method of manufacturing the cathode material, the silicon-containing material, the boron-containing material and the lithium-containing material are dissolved in a solvent such as water or an organic solvent to prepare the mixture solution. The organic solvent is at least one selected from a group consisting of methanol, ethanol, n-propanol, isopropanol, ethylene glycol, 1,2-propylene glycol, 1,3-propylene glycol, glycerol and other higheralcohols.

In one embodiment of the method of manufacturing the cathode material, the silicon-containing material is at least one selected from a group consisting of silicon oxide colloidal solution, tetraethyl orthosilicate, polysilicate, lithium silicate, lithium metasilicate and lithium polysilicate. The boron-containing material is, but not limited to, at least one selected from a group consisting of boron oxide, boric acid, boric acid ester, lithium borate, lithium metaborate, and lithium polyborate. The lithium-containing material is, but not limited to, at least one selected from a group consisting of lithium oxide, lithium hydroxide, lithium carbonate, lithium oxalate, lithium nitrate, lithium acetate and lithium alkoxide ($LiOC_nH_{2n+1}$).

In one embodiment of the method of manufacturing the cathode material, the mixture slurry is dried by a spray-drying method. In another embodiment of the method of manufacturing the cathode material, the mixture slurry is dried in an oven.

In the method of manufacturing the cathode material, the sintering temperature of sintering the dried mixture is in a range from 300 to 800° C. Preferably, the sintering temperature of sintering the dried mixture is in a range from 350 to 600° C. The sintering time of sintering the dried mixture is in a range from 0.5 to 20 h.

In the present invention, the cathode active material is coated with a glassy material. Thus, the lithium ion secondary battery using the cathode material has the long cycle life and the high safety performance. Further, the method for manufacturing the cathode material of the lithium ion secondary battery is very simple, has low production cost and is easy to industrialization.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
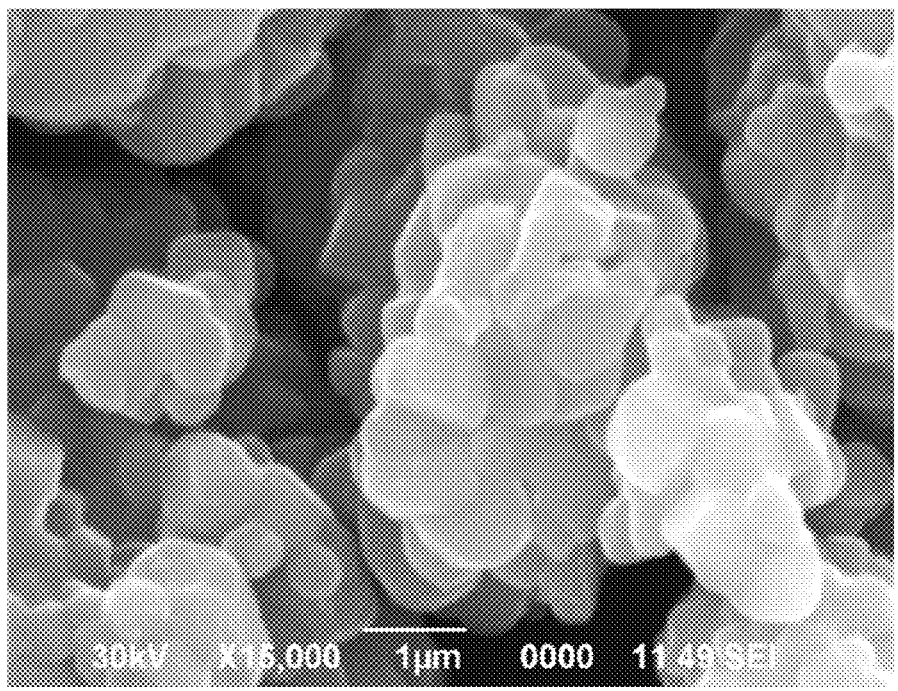
FIG. 1 illustrates a scanning electron microscope (SEM) image of a ternary lithium nickel cobalt manganese oxide without a glassy material coated thereon in accordance with the example 1 of the present invention.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

A cathode material of a lithium ion secondary battery includes a cathode active material and a glassy material coating on the surface of the cathode active material.

The cathode active material is, but not limited to, at least one selected from a group consisting of lithium cobalt oxide, lithium nickel oxide, lithium manganese oxide, lithium nickel cobalt oxide, lithium nickel manganese oxide, lithium nickel cobalt manganese oxide and lithium iron(ii) phosphate.

The glassy material is, for example, a lithium boron silicon oxide. The lithium boron silicon oxide is glassy composite oxide containing lithium, boron and silicon and is an inorganic polymer. The lithium boron silicon oxide coating on the cathode active material forms a compact film, which is capable of selectively allowing the lithium ions to pass therethrough. The lithium boron silicon oxide has the following chemical formula: $Li_xB_ySi_zO_{(0.5x+1.5y+2z)}$ (x>0, y>0, z>0), wherein x, y, z each can be a natural number or a decimal and all excess 0. A molar ratio of boron atoms to silicon atoms in the lithium boron silicon oxide (y:z) is in a range from 1:1 to 10:1, and a molar ratio of lithium atoms to the boron atoms and the silicon atoms in the lithium boron silicon oxide (x:(y+z)) is in a range from 2:1 to 1:10. In one example, a molar ratio of lithium atoms, boron atoms and silicon atoms in the lithium boron silicon oxide (x:y:z) is either 2:2:1 or 2:1:1.

Because the lithium boron silicon oxide has good compactness, the lithium boron silicon oxide coating on the cathode active material can effectively prevent a direct contact of an electrolyte and the cathode active material, thereby avoiding an oxidation-reduction side reaction. Moreover, the lithium-ions can effectively pass through the lithium boron silicon oxide coating on the cathode active material so as to achieve a migration of the lithium ions between the cathode active material and the electrolyte. In addition, the lithium boron silicon oxide coating on the cathode active material has a certain strength, which can inhibit a volume change of the cathode active material in a charge-discharge cycle, thereby preventing a crystal fracture of the cathode active material to some extent. Therefore, the cathode material including the cathode active material and the lithium boron silicon oxide coating on the surface of the cathode active material is used in a lithium ion secondary battery, the lithium ion secondary battery can have the long charge-discharge cycle life and the high safety performance.

In the cathode material, a content of the lithium boron silicon oxide should be suitable. If the content of the lithium boron silicon oxide is too little, the cathode active material can not be coated entirely. Thus, the performance of the cathode material can not be effectively improved. If the content of the lithium boron silicon oxide is too more, the charge-discharge capacity of the cathode material will be greatly decreased. Further, if the lithium boron silicon oxide coating on the surface of the cathode active material is too thick, a migration rate of the lithium ions in the lithium boron silicon oxide will also be reduced. A weight percentage of the lithium boron silicon oxide to the cathode material is in a range from 0.5% to 20.0%. Preferably, the weight percentage of the lithium boron silicon oxide to the cathode material is in a range from 1% to 15.0%. Further preferably, the weight percentage of the lithium boron silicon oxide to the cathode material is in a range from 1.5% to 10.0%.

The cathode material of a lithium ion secondary battery can be manufactured by the following method. At first, a step of preparing a mixture solution by mixing a silicon-containing material, a boron-containing material and a lithium-containing material into a solvent is performed. Then, a cathode active material is added into the mixture solution to form a mixture slurry. Next, the mixture slurry is dried to form a dried mixture. Thereafter, the dried mixture is sintered to obtain the cathode active material coated with a glassy material. Preferably, the dried mixture can be mechanically disintegrated before being sintered.

In the method, the cathode active material is, but not limited to, at least one selected from a group consisting of lithium cobalt oxide, lithium nickel oxide, lithium manganese oxide, lithium nickel cobalt oxide, lithium nickel manganese oxide, lithium nickel cobalt manganese oxide and lithium iron(ii) phosphate.

The silicon-containing material is, but not limited to, at least one selected from a group consisting of silicon oxide colloidal solution, tetraethyl orthosilicate, ploysilicate, lithium silicate, lithium metasilicate and lithium polysilicate. The boron-containing material is, but not limited to, at least one selected from a group consisting of boron oxide, boric acid, boric acid ester, lithium borate, lithium metaborate, and lithium polyborate. The lithium-containing material is, but not limited to, at least one selected from a group consisting of lithium oxide, lithium hydroxide, lithium carbonate, lithium oxalate, lithium nitrate, lithium acetate and lithium alkoxide ($LiOC_nH_{2n+1}$).

In the method of manufacturing the cathode material, the silicon-containing material, the boron-containing material and the lithium-containing material are dissolved in a solvent such as water or an organic solvent to prepare the mixture solution. The organic solvent is, but not limited to, at least one selected from a group consisting of water, methanol, ethanol, n-propanol, isopropanol, ethylene glycol, 1,2-propylene glycol, 1,3-propylene glycol, glycerol and other higher alcohols.

It is noted that, the silicon-containing material, the boron-containing material and the lithium-containing material can be thermally decomposed to silicon oxide, boron oxide and lithium oxide respectively.

Additionally, the lithium boron silicon oxide is used to coat on the surface of the cathode active material because the lithium boron silicon oxide has good lithium ions penetrability and has low softening temperature. Generally, the lithium boron silicon oxide can be softened or melted at about 350° C. Low sintering temperature can reduce the possibility of the cathode active material such as lithium cobalt oxide, lithium manganese oxide, lithium iron(ii) phosphate, lithium nickel cobalt manganese oxide ternary material reacting with the components of the lithium boron silicon oxide to generate electrochemical inactive materials such as cobalt borosilicate, manganese borosilicate, iron borosilicate and nickel borosilicate and relative, electrode material to maintain a high electrochemical charge-discharge capacity. Thus, the cathode material including the cathode active material and the lithium boron silicon oxide coating on the surface of the cathode active material has high charge-discharge capacity.

In the method of manufacturing the cathode material, the mixture slurry can be dried by a spray-drying method or in an oven.

In the method of manufacturing the cathode material, a thermal process such as a sintering process is needed to be applied to the dried mixture so that the silicon oxide, the boron oxide and the lithium oxide can be formed. In one embodiment, a sintering temperature of sintering the dried mixture is in a range from 300 to 800° C. Preferably, the sintering temperature of sintering the dried mixture is in a range from 350 to 600° C. It is noted that, if the sintering temperature is too low, the lithium boron silicon oxide glassy film can not be formed, and if the sintering temperature is too high, the cathode active material can react with the silicon oxide, the boron oxide, thereby reducing the charge-discharge capacity of the cathode material. A sintering time of sintering the dried mixture is in a range from 0.5 to 20 h.

The following examples can prove the improvement of the electrochemical performance of the lithium ion secondary battery using the cathode material coated with the glassy material.

Example 1

Figure 2:
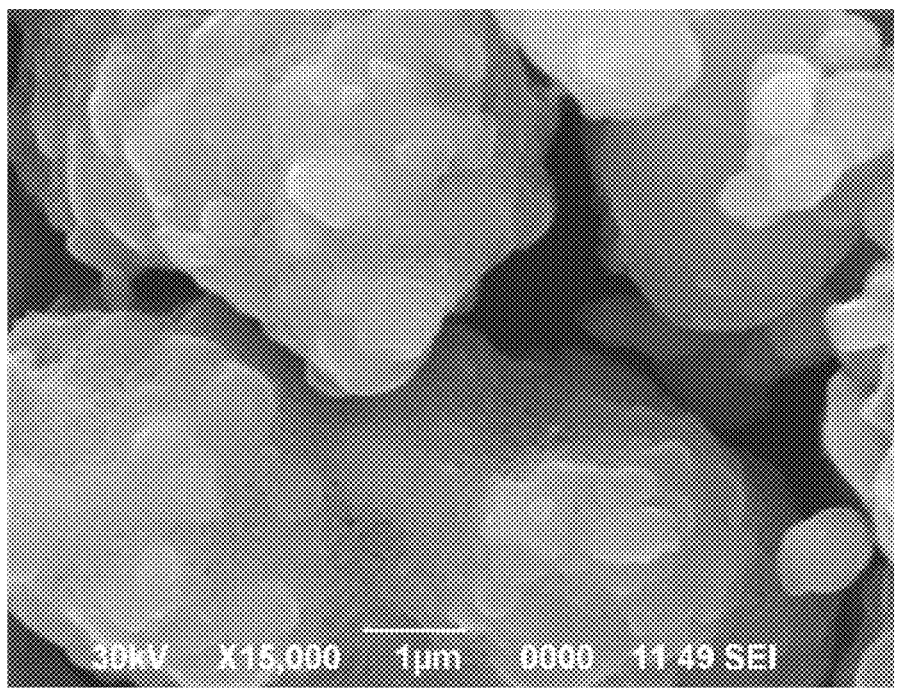
FIG. 2 illustrates a SEM image of a ternary lithium nickel cobalt manganese oxide coated with a glassy material such as a lithium boron silicon oxide in accordance with the example 1 of the present invention.

Preparation of a Cathode Material Including a Cathode Active Material such as Ternary Lithium Nickel Cobalt Manganese Oxide 103.84 g boric acid ($H_3BO_3$) powder (Sinopharm Group, China) and 70.46 g hydrated lithium hydroxide ($LiOH.H_2O$) powder (Aladdin Reagent Co. LTD., China) are mixed into 1500 milliliter (mL) deionized water. During stirring, 3.00 kilogram (Kg) ternary lithium nickel cobalt manganese oxide (ShenZhen TianJiao Technology Development LTD., China) is further mixed into the mixing solution of $H_3BO_3$ and $LiOH.H_2O$. After about 2 h stirring, the ternary lithium nickel cobalt manganese oxide is completely wetted by the mixing solution of $H_3BO_3$ and $LiOH.H_2O$, thereby obtaining a mixture. Then, 168.84 g aqueous slurry containing nano silicon oxide ($SiO_2$) (Hangzhou Wanjing New Material Co., LTD, China) is mixed into the mixture to form a mixture slurry. A solid content of the nano silicon oxide slurry is about 30%. After further 2 h stirring, the mixture slurry is dried at 120° C. in an oven. Thereafter, the dried mixture slurry is mechanically disintegrated and is sintered in a muffle furnace for about 3 h. Then, the sintered mixture is heated from room temperature to 500° C., and maintain the sintered mixture at 500° C. for about 2.5 h. After the mixture is cooled down, referring to FIG. 1 and FIG. 2, the cathode material coated with a glassy material such as lithium boron silicon oxide can be obtained, which can be directly used as the positive electrode of the lithium ion secondary battery. In this example, a molar ratio of lithium atoms, boron atoms and silicon atoms in the lithium boron silicon oxide (Li:B:Si) is 2:2:1.

Fabrication of Soft-Package Lithium Ion Secondary Batteries

In one example, the ternary lithium nickel cobalt manganese oxide is used as a cathode material. The cathode material is mixed with carbon black and polyvinylidene fluoride (PVDF) to form a slurry. A ratio of the cathode material, carbon black and polyvinylidene fluoride is 90:6:4. Then, the slurry is coated on an aluminum foil. A series of steps including compressing, cutting pieces, making electrodes, assembling, filling the electrolyte are performed, thereby forming a number soft-package lithium ion batteries 1# with 14 ampere-hours (Ah) capacity. In the soft-package lithium ion batteries 1#, the cathode material is not coated. The negative electrode is made of graphite.

The soft-package lithium ion batteries 1# are divided into two groups (i.e., a first group and a second group) to be tested.

A first test: the soft-package lithium ion batteries 1# in the first group are firstly charged up to a charging voltage of 4.2V at a charging current of 75 ampere (A), and then are discharged down to discharging voltage arrives at 2.8V at a discharging current of 75 A.

A second test: the soft-package lithium ion batteries 1# in the second group are firstly charged up to a charging voltage of 4.6V at a charging current of 90 A, and then are discharged down to a discharging voltage of 2.8V at a discharging current of 90.

In another example, the ternary lithium nickel cobalt manganese oxide coated with the glassy material such as the lithium boron silicon oxide is used as the cathode material. The cathode material is mixed with carbon black and polyvinylidene fluoride to form a slurry. A ratio of the cathode material, carbon black and polyvinylidene fluoride is 90:6:4. Then, the slurry is coated on an aluminum foil. A series of steps including compressing, cutting pieces, making electrodes, assembling, filling the electrolyte are performed, thereby forming a number of soft-package lithium ion batteries 2# with 12.5 Ah capacity. In the soft-package lithium ion batteries 2#, the cathode active material is coated with the glassy material such as the lithium boron silicon oxide. The negative electrode is made of graphite.

The soft-package lithium ion batteries 2# are also divide into two groups (i.e., a first group and a second group) to be tested.

The first test: the soft-package lithium ion batteries 2# in the first group are firstly charged up to a charging voltage of 4.2V at a charging current of 75 A, and then are discharged down to a discharging voltage of 2.8V at a discharging current of 75 A.

The second test: the soft-package lithium ion batteries 1# in the second group are first charged up to a charging voltage of 4.6V at a charging current of 90 A, and then are discharged down to a discharging voltage of 2.8V at a discharging current of 90 A.

Figure 3:
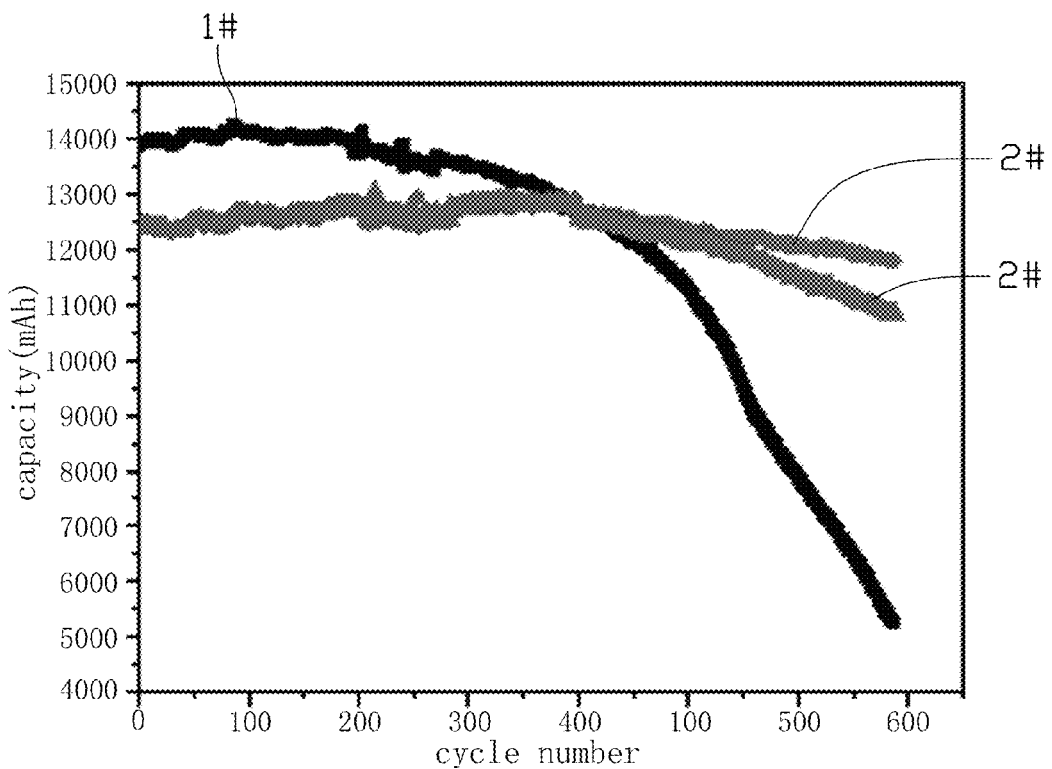
FIG. 3 illustrates a cycle-capacity graph of a soft-package lithium ion battery 1# and two soft-package lithium ion batteries 2# in a first test conditions.
Figure 4:
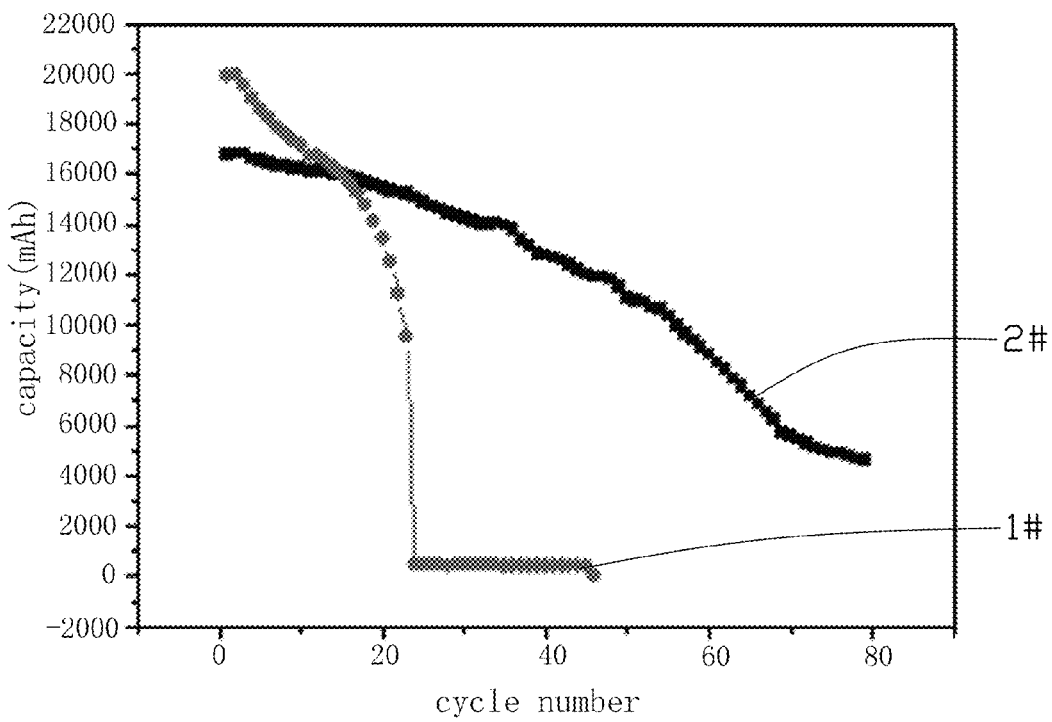
FIG. 4 illustrates a cycle-capacity graph of a soft-package lithium ion battery 1# and two soft-package lithium ion batteries 2# in a second test conditions.

Referring to FIG. 3 and FIG. 4, the charge-discharge cycle performance of the soft-package lithium ion batteries 2# is better than the soft-package lithium ion batteries 1#. Still, referring to FIG. 4, in the second test, for example, a high voltage over charge test, one soft-package lithium ion battery 2# and two soft-package lithium ion batteries 1# are tested. One of the soft-package lithium ion batteries 1# is burned at the $3^{rd}$ charge-discharge cycle, another of the soft-package lithium ion batteries 1# does not work at the $21^{st}$ charge-discharge cycle. The capacity of the soft-package lithium ion battery 2# is decreased with the increase of the charge-discharge cycle number. That is, the cathode active material coated with the glassy material such as the lithium boron silicon oxide can improve the charge-discharge cycle performance of the lithium ion battery.

Example 2

Preparation of a Cathode Material Including a Cathode Active Material such as Ternary Lithium Nickel Cobalt Manganese Oxide 623.0 g boric acid ($H_3BO_3$) powder (Sinopharm Group, China) and 845.5 g hydrated lithium hydroxide ($LiOH.H_2O$) powder (Aladdin Reagent Co. LTD., China) are mixed into 30 liter (L) deionized water. After stirring to completely dissolve the $H_3BO_3$ powder and the $LiOH.H_2O$ powder to form a solution, 2089 g ethyl orthosilicate (Sinopharm Group, China) is added into the solution. Then the solution added with the ethyl orthosilicate is continually stirred for about 10 h until the ethyl orthosilicate is completely hydrolyzed without forming precipitation, thereby obtaining a mixing solution. 50 Kg ternary lithium nickel cobalt manganese oxide (Shenzhen TianJiao Technology Development LTD., China) is further mixed into the mixing solution to form a mixture slurry. After about 30 minutes strongly stirring, the mixture slurry is dried by a spray-drying method. An inlet temperature of a spray-drying apparatus is 380° C., and an outlet temperature of the spray-drying apparatus is 140° C. Thereafter, the dried mixture is sintered in a muffle furnace The dried mixture is heated from room temperature to 500° C. in about 3 h, and maintain the dried mixture at 500° C. for about 2.5 h. After the mixture is cooled down, the cathode active material coated with the glassy material such as lithium boron silicon oxide can be obtained, which can be directly used as the positive electrode of the lithium ion secondary battery. In this example, a molar ratio of lithium atoms, boron atoms and silicon atoms in the lithium boron silicon oxide (Li:B:Si) is 2:1:1.

Example 3

Figure 5:
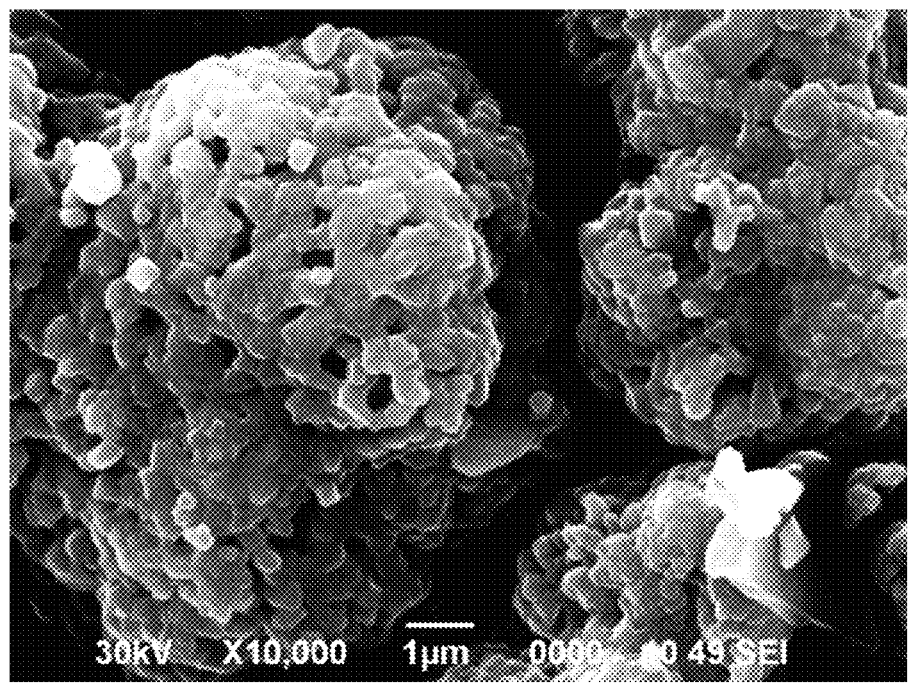
FIG. 5 illustrates a SEM image of a lithium manganese oxide without a glassy material coated thereon in accordance with the example 3 of the present invention.
Figure 6:
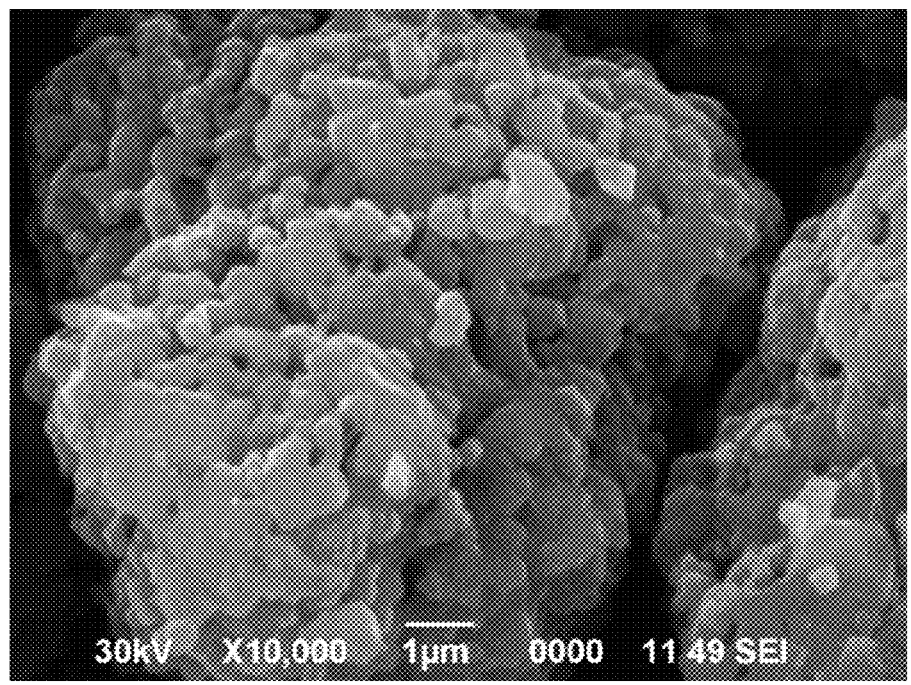
FIG. 6 illustrates a SEM image of a lithium manganese oxide coated with a glassy material such as a lithium boron silicon oxide in accordance with the example 3 of the present invention.

Preparation of a Cathode Material Including a Cathode Active Material such as Lithium Manganese Oxide 37.39 g boric acid ($H_3BO_3$) powder (Sinopharm Group, China) and 50.75 g hydrated lithium hydroxide ($LiOH.H_2O$) powder (Aladdin Reagent Co. LTD., China) are mixed into 1560 mL deionized water. After stirring to completely dissolve the $H_3BO_3$ powder and the $LiOH.H_2O$ powder to form a solution, 125.84 g ethyl orthosilicate (Sinopharm Group, China) is added into the solution. Then the solution added with the ethyl orthosilicate is continually stirred for about 6 h until the ethyl orthosilicate is completely hydrolyzed without forming precipitation, thereby obtaining a mixing solution. 2925 g lithium manganese oxide (Shenzhen TianJiao Technology Development LTD., China) is further mixed into the mixing solution to form a mixture slurry. After further 2 h stirring, the mixture slurry is dried at 120° C. in an oven. Thereafter, the dried mixture is mechanically disintegrated and is sintered in a muffle furnace. The dried mixture is heated from room temperature to 500° C. in about 3 h, and maintain the mixture at 500° C. for about 2.5 h. After the mixture is cooled down, the cathode active material coated with the glassy material such as lithium boron silicon oxide can be obtained, which can be directly used as the positive electrode of the lithium ion secondary battery. Particularly, referring to FIG. 5 and FIG. 6, alveolate pores on the surface of the cathode active material are covered by the glassy material comprised of the lithium boron silicon oxide. In this example, a molar ratio of lithium atoms, boron atoms and silicon atoms in the lithium boron silicon oxide (Li:B:Si) is 2:1:1.

Example 4

Figure 7:
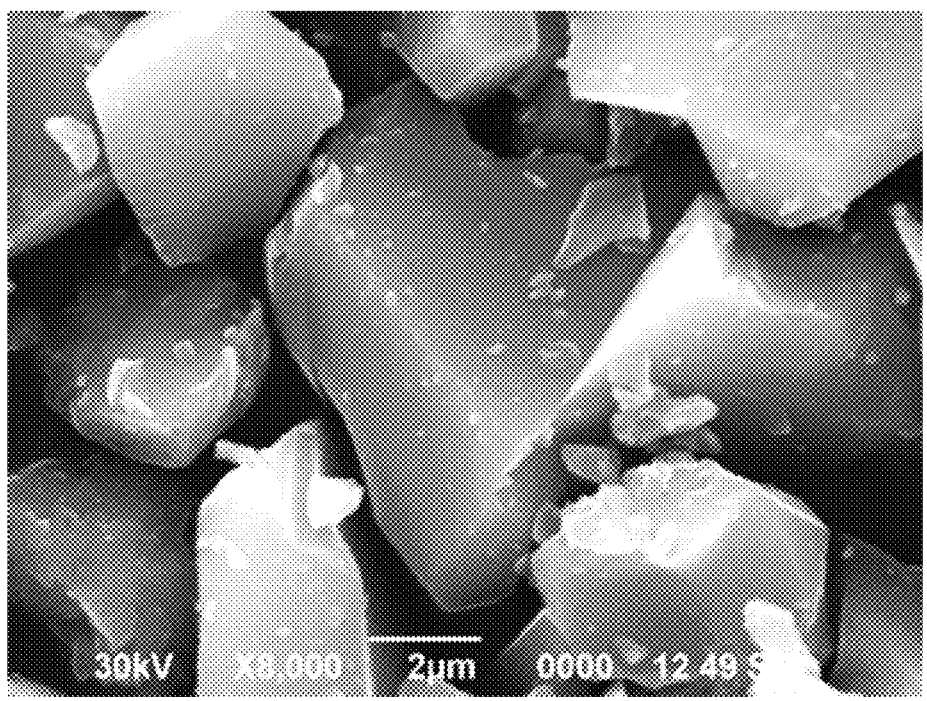
FIG. 7 illustrates a SEM image of a lithium manganese oxide without a glassy material coated thereon in accordance with the example 4 of the present invention.
Figure 8:
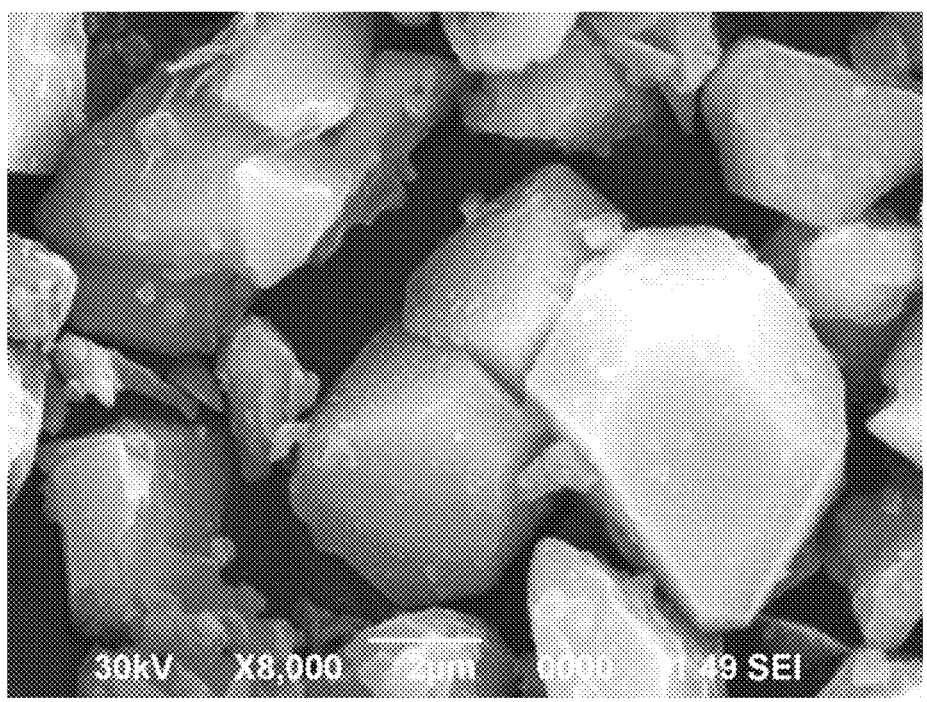
FIG. 8 illustrates a SEM image of a lithium manganese oxide coated with a glassy material such as a lithium boron silicon oxide in accordance with the example 4 of the present invention.

Preparation of a Cathode Material Including a Cathode Active Material Such as Lithium Manganese Oxide 37.39 g boric acid ($H_3BO_3$) powder (Sinopharm Group, China) and 50.75 g hydrated lithium hydroxide ($LiOH.H_2O$) powder (Aladdin Reagent Co. LTD., China) are mixed into 2420 mL deionized water. After stirring to completely dissolve the $H_3BO_3$ powder and the $LiOH.H_2O$ powder to form a solution, 125.84 g ethyl orthosilicate (Sinopharm Group, China) is added into the solution. Then the solution added with the ethyl orthosilicate is continually stirred for about 6 h until the ethyl orthosilicate is completely hydrolyzed without forming precipitation, thereby obtaining a mixing solution. 2925 g lithium manganese oxide (Qingdao Xinzheng LTD., China) is further mixed into the mixing solution to form a mixture slurry. After further 2 h stirring, the mixture slurry is dried at 120° C. in an oven. Thereafter, the dried mixture slurry is mechanically disintegrated and is sintered in a muffle furnace. The dried mixture is heated from room temperature to 500° C. in about 3 h, and maintain the mixture at 500° C. for about 2.5 h. After the mixture is cooled down, the cathode active material coated with the glassy material such as lithium boron silicon oxide can be obtained, which can be directly used as the positive electrode of the lithium ion secondary battery. Particularly, referring to FIG. 7 and FIG. 8, the cathode active material such as the lithium manganese oxide are covered by a thin uniform glassy material film comprised of the lithium boron silicon oxide. In this example, a molar ratio of lithium atoms, boron atoms and silicon atoms in the lithium boron silicon oxide (Li:B:Si) is 2:1:1.

Example 5

Figure 9:
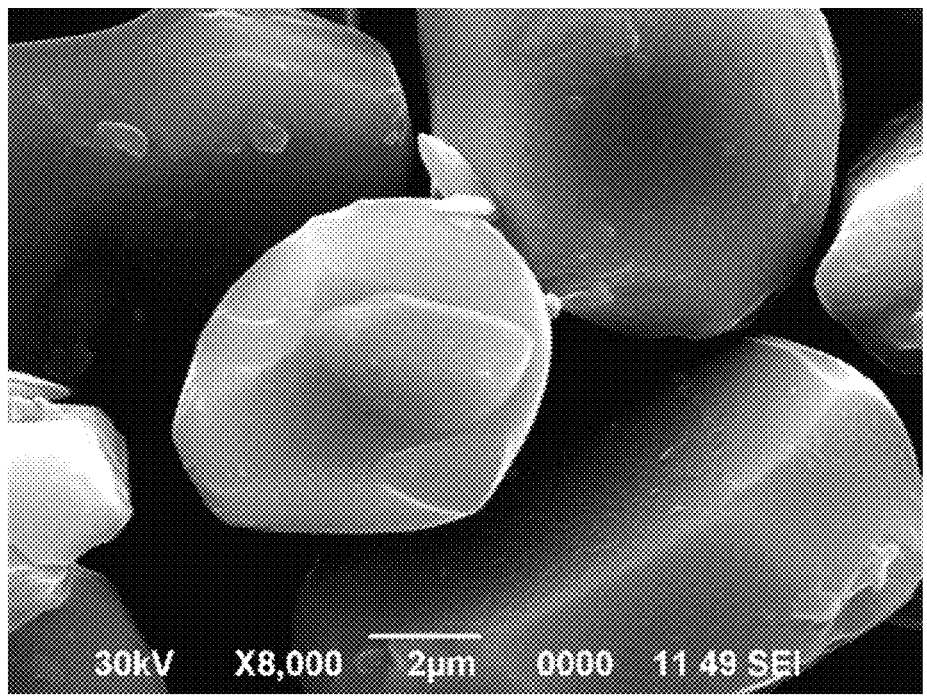
FIG. 9 illustrates a SEM image of a lithium cobalt oxide without a glassy material coated thereon in accordance with the example 5 of the present invention.
Figure 10:
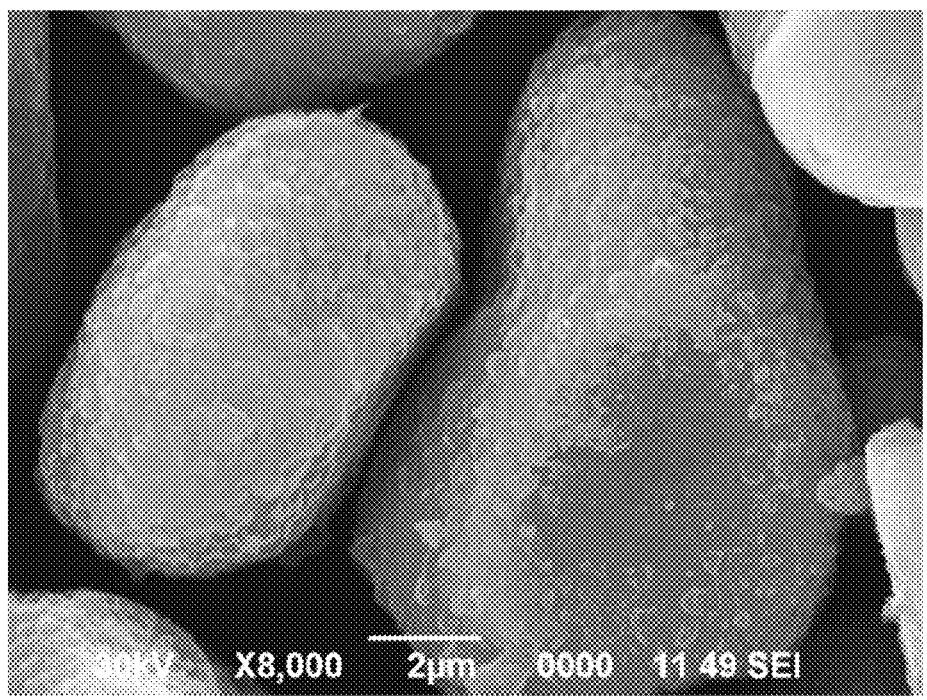
FIG. 10 illustrates a SEM image of a lithium cobalt oxide coated with a glassy material such as a lithium boron silicon oxide in accordance with the example 5 of the present invention.

Preparation of the Cathode Material Including a Cathode Active Material Lithium Cobalt Oxide 37.39 g boric acid ($H_3BO_3$) powder (Sinopharm Group, China) is mixed into 600 mL deionized water and 2400 mL absolute ethyl alcohol. After stirring to completely dissolve the $H_3BO_3$ to form a solution, 125.84 g ethyl orthosilicate (Sinopharm Group, China) is added into the solution. Then the solution added with the ethyl orthosilicate is continually stirred until the solution is transparent and uniform and has no precipitation formed, thereby obtaining a mixing solution. 2925 g lithium cobalt oxide (Shenzhen TianJiao Technology Development LTD., China) is further mixed into the mixing solution to form a mixture slurry. After further 10 minutes stirring, 50.75 g hydrated lithium hydroxide ($LiOH.H_2O$) powder (Aladdin Reagent Co. LTD., China) are mixed into the mixture slurry. After 4 h stirring, the mixture slurry with hydrated lithium hydroxide is dried by a spray-drying method. Thereafter, the dried mixture slurry is sintered in a muffle furnace. The dried mixture is heated from room temperature to 500° C. in about 3 h, and maintain the dried mixture at 500° C. for about 2.5 h. After the mixture is cooled down, the cathode active material coated with the glassy material such as lithium boron silicon oxide can be obtained, which can be directly used as the positive electrode of the lithium ion secondary battery. Particularly, referring to FIG. 9 and FIG. 10, the cathode active material such as the lithium cobalt oxide are covered by a glassy material layer structure consisting of plate-like lithium boron silicon oxide. In this example, a molar ratio of lithium atoms, boron atoms and silicon atoms in the lithium boron silicon oxide (Li:B:Si) is 2:1:1.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A cathode material of a lithium ion secondary battery, comprising:
   an cathode active material; and
   a glassy material coating on a surface of the cathode active material, wherein the glassy material is capable of selectively allowing lithium ions to pass therethrough, wherein the glassy material is a lithium boron silicon oxide having the following chemical formula: $Li_xB_ySi_zO_{(0.5x+1.5y+2z)}$, wherein a molar ratio of boron atoms to silicon atoms in the lithium boron silicon oxide (y:z) is in a range from 1:1 to 10:1, and a molar ratio of lithium atoms to the boron atoms and the silicon atoms in the lithium boron silicon oxide (x:(y+z)) is in a range from 2:1 to 1:10.

2. The cathode material of the lithium ion secondary battery of claim 1, wherein the cathode active material is at least one selected from a group consisting of lithium cobalt oxide, lithium nickel oxide, lithium manganese oxide, lithium nickel cobalt oxide, lithium nickel manganese oxide, lithium nickel cobalt manganese oxide and lithium iron(ii) phosphate.

3. The cathode material of the lithium ion secondary battery of claim 1, wherein a molar ratio of lithium atoms, boron atoms and silicon atoms in the lithium boron silicon oxide (x:y:z) is either 2:2:1 or 2:1:1.

4. The cathode material of the lithium ion secondary battery of claim 1, wherein a weight percentage of the lithium boron silicon oxide to the cathode material is in a range from 0.5% to 20.0%.

5. The cathode material of the lithium ion secondary battery of claim 1, wherein a weight percentage of the lithium boron silicon oxide to the cathode material is in a range from 1% to 15.0%.

6. The cathode material of the lithium ion secondary battery of claim 1, wherein a weight percentage of the lithium boron silicon oxide to the cathode material is in a range from 1.5% to 10.0%.

7. A method for manufacturing a cathode material of a lithium ion secondary battery, comprising:
   preparing a mixture by mixing a silicon-containing material, a boron-containing material and a lithium-containing material into a solvent;
   forming a mixture slurry by uniformly stirring a cathode active material into the mixture;
   drying the mixture slurry to form a dried mixture; and sintering the dried mixture to obtain the cathode active material coated with a glassy material, wherein the glassy material is capable of selectively allowing lithium ions to pass therethrough, wherein the glassy material is a lithium boron silicon oxide having the following chemical formula: $Li_xB_ySi_zO_{(0.5x+1.5y+2z)}$, wherein a molar ratio of boron atoms to silicon atoms in the lithium boron silicon oxide (y:z) is in a range from 1:1 to 10:1, and a molar ratio of lithium atoms to the boron atoms and the silicon atoms in the lithium boron silicon oxide (x:(y+z)) is in a range from 2:1 to 1:10.

8. The method of claim 7, wherein the cathode active material is at least one selected from a group consisting of lithium cobalt oxide, lithium nickel oxide, lithium manganese oxide, lithium nickel cobalt oxide, lithium nickel manganese oxide, lithium nickel cobalt manganese oxide and lithium iron(ii) phosphate.

9. The method of claim 7, wherein the solvent is at least one selected from a group consisting of water, methanol, ethanol, n-propanol, isopropanol, ethylene glycol, 1,2-propylene glycol, 1,3-propylene glycol and glycerol.

10. The method of claim 7, wherein the silicon-containing material is at least one selected from a group consisting of silicon oxide colloidal solution, tetraethyl orthosilicate, polysilicate, lithium silicate, lithium metasilicate and lithium polysilicate.

11. The method of claim 7, wherein the boron-containing material is at least one selected from a group consisting of boron oxide, boric acid, boric acid ester, lithium borate, lithium metaborate, and lithium polyborate.

12. The method of claim 7, wherein the lithium-containing material is at least one selected from a group consisting of lithium oxide, lithium hydroxide, lithium carbonate, lithium oxalate, lithium nitrate, lithium acetate and lithium alkoxide.

13. The method of claim 7, wherein the mixture slurry is dried by a spray-drying method.

14. The method of claim 7, wherein the mixture slurry is dried in an oven.

15. The method of claim 7, wherein the sintering temperature of sintering the dried mixture is in a range from 300 to 800° C.

16. The method of claim 7, wherein the sintering time of sintering the dried mixture is in a range from 0.5 to 20 h.

17. The method of claim 7, wherein a molar ratio of lithium atoms, boron atoms and silicon atoms in the lithium boron silicon oxide (x:y:z) is either 2:2:1 or 2:1:1.

* * * * *